(12) United States Patent
Andersson et al.

(10) Patent No.: US 10,398,967 B2
(45) Date of Patent: Sep. 3, 2019

(54) GAME CONTROLLER

(71) Applicant: MOVEAIM AB, Helsingborg (SE)

(72) Inventors: Bengt Andersson, Helsingborg (SE);
Björn Andersson, Helsingborg (SE)

(73) Assignee: MOVEAIM AB, Helsingborg (SE)

( * ) Notice: Subject to any disclaimer, the term of this patent is extended or adjusted under 35 U.S.C. 154(b) by 0 days.

(21) Appl. No.: 15/561,925

(22) PCT Filed: Mar. 23, 2016

(86) PCT No.: PCT/SE2016/050236
§ 371 (c)(1),
(2) Date: Sep. 26, 2017

(87) PCT Pub. No.: WO2016/159858
PCT Pub. Date: Oct. 6, 2016

(65) Prior Publication Data
US 2018/0117458 A1     May 3, 2018

(30) Foreign Application Priority Data
Mar. 30, 2015  (SE) ........................................ 1550377

(51) Int. Cl.
*A63F 9/24* (2006.01)
*A63F 13/00* (2014.01)
(Continued)

(52) U.S. Cl.
CPC .............. *A63F 13/24* (2014.09); *A63F 13/00* (2013.01); *G05G 9/047* (2013.01); *G06F 3/033* (2013.01);
(Continued)

(58) Field of Classification Search
USPC ........................ 463/5, 20, 22, 25, 30, 37, 39
See application file for complete search history.

(56) References Cited

U.S. PATENT DOCUMENTS

| | | | |
|---|---|---|---|
| 6,906,700 B1 * | 6/2005 | Armstrong | G05G 9/04737 345/156 |
| 2008/0242385 A1 * | 10/2008 | Miyamoto | A63F 13/06 463/1 |

(Continued)

FOREIGN PATENT DOCUMENTS

| | | |
|---|---|---|
| WO | WO-9532777 A1 | 12/1995 |
| WO | WO-2004081696 A2 | 9/2004 |

(Continued)

OTHER PUBLICATIONS

International Search Report and Written Opinion dated May 26, 2016 for PCT Application No. PCT/SE2016/050236.

*Primary Examiner* — Adetokunbo O Torimiro
(74) *Attorney, Agent, or Firm* — Moser Taboada

(57) ABSTRACT

The present invention relates an input controller (100) for interacting with a virtual environment, and more specifically to an input controller comprising a first body (102) and a second body (104) connected to the first body, wherein the first body comprises a first input device (106) and the second body comprises a second input device (108). The first input device provides input control to the virtual environment with a first movement with at least 5 degrees of freedom in the virtual environment, the first movement being a relative movement, and the second input device provides input control to the virtual environment with a second movement with at least 2 degrees of freedom in the virtual environment, the second movement being an absolute movement.

18 Claims, 6 Drawing Sheets

(51) Int. Cl.
*G06F 17/00* (2019.01)
*G06F 19/00* (2018.01)
*A63F 13/24* (2014.01)
*G05G 9/047* (2006.01)
*G06F 3/0346* (2013.01)
*G06F 3/0354* (2013.01)
*G06F 3/0362* (2013.01)
*G06F 3/033* (2013.01)

(52) U.S. Cl.
CPC .......... *G06F 3/0346* (2013.01); *G06F 3/0362* (2013.01); *G06F 3/03543* (2013.01); *G06F 3/03544* (2013.01); *G06F 3/03547* (2013.01)

(56) References Cited

U.S. PATENT DOCUMENTS

2010/0279773 A1    11/2010  Atzmon
2013/0324254 A1* 12/2013  Huang .................... G06F 3/016
                                                    463/37

FOREIGN PATENT DOCUMENTS

| WO | WO-2005103869 A2 | 11/2005 |
| WO | WO-2008139552 A1 | 11/2008 |
| WO | WO-2011056104 A1 | 5/2011 |

* cited by examiner

GAME CONTROLLER

TECHNICAL FIELD

The present invention relates to an input controller for interacting with a virtual environment, and more specifically to an input controller comprising a first body and a second body connected to the first body, wherein the first body comprises a first input device and the second body comprises a second input device.

BACKGROUND OF THE INVENTION

In computer engineering, different kinds of pointers and positioning means are used as input controllers, such as a joystick, a control ball, a mouse etc, which in manual operation generate electric control signals for multidimensional controlling. Position control in CAD work or in computer and TV games often requires controllability within several degrees of freedom or dimensions. A user should be able to perform with his hand a number of different controlling movements in a logic or intuitive manner. In some modern applications, especially computer games, controllability is required in up to six dimensions in the virtual environment, i.e. a linear movement in three directions and a rotating movement in three directions.

Moreover, depending on what type of position control that is needed in the virtual environment, different types of controllability are advantageously used for performing the position control in an easy to control and logic or intuitive manner.

US 2013/0324254 (Sony Computer Entertainment Inc.) relate to a controller device to interface with a computer gaming system including a body having a handle. A touch surface is disposed on one side of the handle. The touch surface provides an area for receiving directionality control in response to interfacing by a finger of a user. By moving the handle, a user can accomplish position control by allowing position and movement tracking of the handle by the gaming system that relates to the player's movements and use these movements as inputs for the game. Such a position control (also known as Motion Control) may be advantageous for controlling e.g. a tennis racket in a tennis simulator game, or a weapon in an action game, wherein the controllability may be accomplished in up to six dimensions in the virtual environment.

The touch surface can be used for a different type of position control, e.g. for selecting items in a menu.

However, for certain types of virtual environments, the position control accomplished by movements of the handle is insufficient or even unsuitable.

It is within this context that embodiments of the invention arise.

SUMMARY OF THE INVENTION

In view of the above, an objective of the invention is to solve or at least reduce one or several of the drawbacks discussed above. Generally, the above objective is achieved by the attached independent patent claims.

According to a first aspect, the present invention is realized by an input controller for interacting with a virtual environment, comprising: a first body and a second body connected to the first body, wherein the first body comprises a first input device resiliently suspended on the input controller so as to spring-back to a first origin when moved and released, the first input device being arranged to move around, or relative, the first origin with at least 5 degrees of freedom and arranged to interact with the virtual environment by a first movement with at least 5 degrees of freedom in the virtual environment, the first movement corresponding to a movement by the first input device around, or relative, the first origin, wherein the first movement is a relative movement.

The second body comprises a second input device being arranged for receiving an input in at least 2 degrees of freedom in relative a second origin, the second input device being arranged to interact with the virtual environment by a second movement with at least 2 degrees of freedom in the virtual environment, the second movement corresponding to a received input of the second input device in respect of, or relative, the second origin, wherein the second movement is an absolute movement, wherein the input controller further comprises a suspension device fixed to the input controller and extending on an inside of the first body to a center of the first input device, the suspension device providing a suspension point substantially at a center of the first input device for the resilient suspension of the first input device, wherein the first origin is located at the suspension point.

By the term "substantially at the center" should, in the context of the present specification, be understood that the end part is placed at a mid section of the first input device, or within a distance from the center corresponding to 1%, or 3%, or 5%, or 10%, of the distance from the center of the first input device to an outer surface of the same.

By the term "center" should, in the context of the present specification, be understood as a center with respect to volume or mass of the input device.

By the term "first movement corresponding to a movement by the first input device relative the first origin" should, in the context of present specification, be understood that the first movement comprises a linear movement (in three directions) and a rotating movement (in at least two direction but according to some embodiments, three directions), i.e. at least 5 degrees of freedom (DOF), and that the linear movement and rotation movement depends on how the first input device is moved relative the first origin. The first input device is suspended on the input device such that it is free to move forward/backward, up/down, left/right (translation in three perpendicular axes) around the first origin combined with rotation about three perpendicular axes (often termed pitch, yaw, and optionally roll) around the first origin. For example, if the input device is moved forward (along an x-axis) and at the same time rotated around the z-axis (yaw), the resulting first movement will be a circular movement with a forward motion. The speed or acceleration of the two different movements, the forward motion and the rotation, will depend on how far from the first origin the first input device is in x-axis and how much it is rotated around, or relative, the z-axis. The first movement is thus a relative movement. In other words, the displacement, translation and rotation of the first movement, and the velocity or acceleration of the first movement is based on the current position of the first input device relative the first origin in which the input by the first input device is received. In yet other words, the first movement is a relative movement such that a velocity or acceleration of the first movement is based on at least one of a distance between a current position of the first input device and the first origin, and a amount of rotation of the first input device around the first origin.

This will be further explained in conjunction with FIG. 3 below.

By the term "second movement corresponding to a received input of the second input device relative the second origin" should in the context of present specification, be understood that the second movement comprises at least a linear movement (in at least two directions, but up to three directions) and optionally rotating movement (in three directions). This depends on the type of input device as will be described more in detail below. However, the second movement is an absolute movement such that the position of the second input device or the position of the current position of received input in respect of the second origin determines the actual finish point of the second movement, i.e. the length or displacement of the second movement is based on a distance between a position of the received input and the second origin. In some cases, an amount of rotation between the position of the received input relative the second origin, and/or an amount of rotation of the second input device relative the second origin will determine the displacement, e.g. in the case the second input device is a trackball input device. In the case the second input device is arranged to interact with the virtual environment by a second movement 6 degrees of freedom in the virtual environment, the displacement, translation and rotation of the second movement is based on the current position of the second input device relative the second origin in which the input by the second input device is received and an amount of rotation between the position of the received input relative the second origin, and/or an amount of rotation of the second input device relative the second origin. In other words, the second movement is an absolute movement such that a displacement of the second movement is based on at least one of a distance between a position of the received input and the second origin, an amount of rotation between the position of the received input relative the second origin, and an amount of rotation of the second input device relative the second origin. In yet other words, the displacement of the second movement is based on changes in each by the second input device measured degrees of freedom relative the second origin.

By the term "displacement of the second movement" should in the context of the present specification, be understood that if the virtual environment is a 3D environment, such a displacement may be in a 3D projection of the virtual environment.

Both the first and second input devices are spatial input devices. The first input device provides relative input with 6 degrees of freedom to the virtual environment and the second input device provides absolute input with at least 2 degrees of freedom to the virtual environment.

The present invention is based on the idea that combining an input device allowing relative movements in at least 5 DOF with an input device allowing absolute movements in at least 2 DOF, the input controller can handle many different types of movements in a virtual environment in an advantageous way. The at least 5 DOF input device can be used for quickly and with full freedom moving around in the virtual environment, wherein such movements can be controlled by one hand of the user by twisting and pushing the resiliently suspended input device around the first origin. Since the first input device is resiliently suspended, an ergonomic way of controlling movements in at least 5 DOF in the virtual environment is achieved. The input device allowing absolute movements in at least 2 DOF can be used for other tasks in the virtual environment such as aiming in an action game, selection of items in the virtual environment, or editing of a surface in the virtual environment. The input controller may be arranged to control the virtual environment wirelessly or via a wire.

By providing a first input device resiliently suspended on the input controller so as to spring-back to a first origin when moved and released, a tactile feedback is provided, which means that a user may have a sense of where the origin is located. Moreover, a quick and easy way for returning to the origin is provided, i.e. by letting the first input device go. When moving and twisting the first input device, the user will feel the tension in the suspension building up, and by then releasing the first input device, the suspension will pull/turn the handle back to the origin.

Moreover, by providing a suspension point substantially in the center of the first input device, a force applied by e.g. a hand of a user will be applied through the first origin for all types of translational motions caused by the first input device, for example if the user wants to interact with the virtual environment such that a body shifts from one point in space to another in the virtual environment. Compare with if the first input device has an origin which is not in the center of the first input device. In that case, if the user wants e.g. a character in the virtual environment to strafe left and thus moves the first input device to the left, the user must compensate for the torque building up in the suspension due to the non-symmetrically positioned first origin in order not to rotate as well. The tactile feedback from the first input device and the visual feedback from the screen will give the user mixed messages. In the present embodiment, such mixed messages may be avoided.

The first input device is defined as a part of the first body being resiliently suspended on the input controller so as to spring-back to a first origin when moved and released. For example, in case the first input device is placed at an end of an elongated body, only the end of the first body is resiliently suspended and will spring-back when moved and released. In another example, the first input device comprises the entire first body and in this case the entire first body and in this case the entire first body is resiliently suspended and will spring-back when moved and released.

According to some embodiments, the suspension device comprises an end part substantially at the center of the first input device, and a plurality of springs attached to the end part, wherein the first input device is resiliently suspended on the input controller by being attached to the plurality of springs.

According to some embodiments, the end part has a spherical shape, and the plurality of springs are attached to the surface of the spherical shaped end part in an evenly spread out fashion. By the term "evenly spread out fashion", it is here to be understood that the plurality of springs are evenly spaced apart about the surface of the spherical shaped end part.

According to some embodiments, the end part is shaped as a thin and flat object, e.g. a plate or disc, and the plurality of springs is attached to one side of the end part in an evenly spread out fashion. By the term "evenly spread out fashion", it is here to be understood that the plurality of springs are evenly spaced apart.

According to some embodiments, the suspension device is fixed to the second body. This may provide an improved stability when using the input controller, since the user may hold the second body in one hand and move the first input device with the second hand.

According to some embodiments, the first origin is located in the center of the first body. This may further improve the correctness when the user wants to provide translational motions to the virtual environment, since the entire first body thus is the first input device.

By the term "center of the first body" should, in the context of the present specification, be understood as a center with respect to volume or mass of the first body.

According to some embodiments, the first input device is resiliently suspended on the second body, and wherein the first input device is arranged to move around the first origin with at least 5 degrees of freedom by movements of the first body in respect of the second body. This is advantageous in that the first input device can be controlled by one hand of the user, while the other hand holds the second body and controls the second input device. The second body can thus be hold still while the first input device can be moved and twisted in a controlled way by moving the first body in respect of the second body. The second body is thus acting in a counteracting way in respect of movements of the first input device. When stopping the pushing and/or twisting of the first body in respect of the second body, the first body will always bounce back to its original position in respect of the second body due to the fact that it is resiliently suspended on the second body.

According to some embodiments, the input controller has a symmetrically design. This is advantageous for ergonomic reasons when using the input controller, and also for stability reasons when moving and twisting the first input device around the first origin. The symmetrical design also makes the input device ambidextrous.

According to some embodiments, each of the first and the second body has a substantially cylindrical shape and the first body is connected with the second body such that the input controller is shaped as an eight in cross section. This embodiment is advantageous in that the shape is compact, and the second body provides good counteracting in respect of movements of the first body and thus movements of the first input device. Moreover, by providing a cylindrically shaped first body, it is easier to change grip when moving the first body in respect of the second body. In this way a user can control the first movement by moving the first body using his/hers fingers or wrist or a combination of both.

According to some embodiments, the second input device is a pressure pad and the second origin is located at a position on the pressure pad in which a proceeding input was received by the pressure pad. The pressure pad and the second movement may thus be controlled using e.g. the thumb of the hand holding the second body. A pressure pad is alternatively referred to as a glide pad, glide point, pressure sensitive tablet, track pad, a touchpad and operated by using a finger and dragging it across the surface of the pressure pad. Since the pressure pad provide absolute movements to the virtual environment, and the second origin is located at a position on the pressure pad in which a proceeding input was received by the pressure pad; as a user moves his or her finger (thumb) on the surface, the second movement in the virtual environment will be in the same direction as the movement of the finger on the surface of the pressure pad. The speed of the second movement will correspond to the speed of which the user moves his or her finger on the surface. Using a pressure pad for controlling the second movement is advantageous since the second movement can be controlled by small movements of the finger of the user. The pressure pad is according to one embodiment advantageously positioned proximate to a location of a thumb of the user's single hand holding the second body.

According to some embodiments, each of the first and the second body comprises an elongated handle portion configured for holding by a single hand of a user and wherein the first body is directly electrically connected to the second body via a wire. This embodiment is advantageous for controlling an virtual environment when the user is standing up and uses movement of the entire body of the user, e.g. by waving his arms or moving around in the room where he stands for controlling parts of the virtual environment using a video camera (for example a dance simulator). In this type of applications, an input device configured to be held by both hands of the user separately from each other may be advantageous, e.g. for balance reasons and freedom to move for the user. By connecting the first and second body via an electrical wire, the first and the second input device may share power source, e.g. a battery. According to some embodiments, the wire is configured to transmit data between the first and the second input device. Consequently, the cost for the electronics in the input devices may be reduced, for example by letting the first and second input device share a common processor and/or memory.

According to some embodiments, the suspension device is fixed to the elongated handle portion of the first body.

According to some embodiments, the first input device is disposed at one end of the elongated handle portion of the first body, wherein the first input device is resiliently suspended on the elongated handle portion of the first body. By this embodiment, the user can push and/or twist the first input device in respect of the first origin using his or her fingers, while the handle portion is held still by the hand of the user and thus acts in a counteracting way as described above.

According to some embodiments, the second input device is a pressure pad positioned on the second body proximate to a location of a thumb of the user's single hand, when the input controller is held, and wherein the second origin is located at a position on the pressure pad in which a proceeding input was received by the pressure pad. Consequently, an easy and convenient way of providing the second movement of the virtual environment may be achieved.

According to some embodiments, the second input device is arranged for receiving the input in 6 degrees of freedom in respect of, or relative, the second origin by movement of the second body relative the second origin, wherein the second origin is located at a position in space in which the second body was located when a proceeding input was received by the second input device. By moving the second body, a user can thus accomplish a second movement that relates to the users movements. Such a second input device may be advantageous for controlling e.g. a tennis racket in a tennis simulator game, or a weapon in an action game, wherein the controllability may be accomplished in up to six dimensions in the virtual environment in an absolute way. This means e.g. that the faster you swing the second body, the harder will you hit the ball in the tennis simulator, and the swinging motion of the virtual tennis racket will correspond to the swinging motion of the second body when it comes to direction of the swing, angle of the swing, rotation of the swing etc. The proceeding input may be when the user starts to swing the second body, or when a button is pressed on the second body which marks the start of a tracking of position and rotation of the second input device.

According to some embodiments, the first body and the second body are integrally formed, and the input controller is configured for holding by a single hand of a user and moved on an underlying surface. According to this embodiment the received input of the second input device is based on a movement of the input controller relative to the underlying surface. Such a controller may for example function as a computer mouse and the second movement may correspond to a movement controlled by a regular computer mouse.

According to some embodiments, the input controller has a recess in a surface of the input controller configured to be moved on the underlying surface, wherein the first input device is resiliently suspended in the recess. By this design, the user of the input controller may easily push and twist the first input device around the first origin using his or hers finger and at the same time control the second movement by moving the input controller as a computer mouse is normally moved for controlling movements in a virtual environment. The input controller according to this embodiment may even be shaped as computer mouse to facilitate easy usage of the input controller.

According to some embodiments, the first body and the second body are integrally formed, wherein the second body comprises a protruding part, wherein the first input device is a cylinder shaped device that encompasses the protruding part of the second body 104, and is arranged to move around the protruding part, and the second input device is a pressure pad located on a top surface of the protruding part. As described above, the second origin for a pressure pad is located at a position on the pressure pad in which a proceeding input was received by the pressure pad.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF EMBODIMENTS

Figure 1:
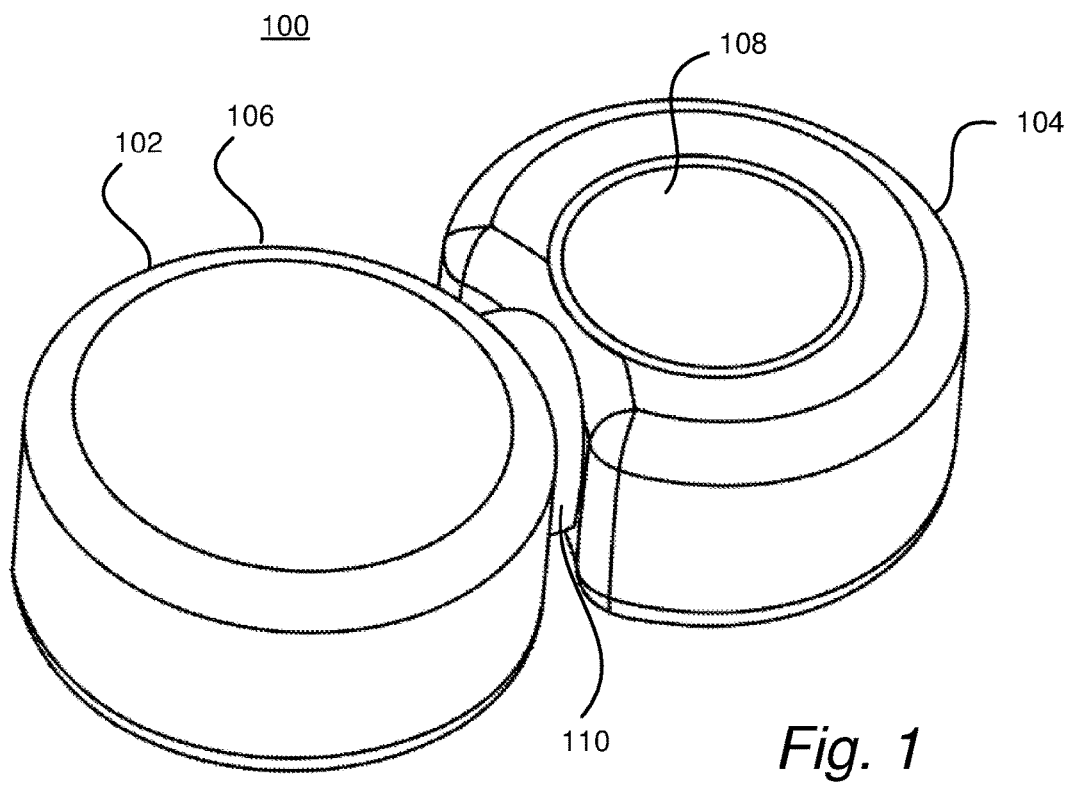
FIG. 1 shows an input controller according to a first embodiment.

FIG. 1 shows by way of example an input controller 100 according to embodiments of the invention. The input controller 100 comprises a first body 102 and a second body 104. The first body 102 is coupled to the second body 104 via a flexible joint 110. The first body 102 comprises a first input device 106. In the embodiment shown in FIG. 1, the first input device is fixed to the first body such that a movement of the first body 102 means a movement of the first input device 106. In the embodiment shown in FIG. 1 the second body 104 provides a suspension device (not shown, see FIG. 8-9 for examples) for the suspension of the first body 102 extending on an inside of the first body 102 to a center of the first input device 106. The suspension device may provide a suspension point substantially at a center of the first input device 106 for the resilient suspension of the first input device 106, wherein the first origin is located at the suspension point. The first input device 106 may spring-back to the first origin when moved and released as a result of its suspension on the suspension device. As soon as forces start acting on the first body 102 and/or the second body 104, the first input device 106 is arranged to move around the first origin with 6 degrees of freedom since the first body 102 will be moved and/or twisted in respect of the second body 104 via the suspension device.

When used for controlling a virtual environment, the first input device 100 is arranged to interact with the virtual environment by a first movement with 6 degrees of freedom in the virtual environment. The first movement corresponds to a movement by the first input device 106 around the first origin in that a linear movement (in three directions, along the x-axis, along the y-axis and along the z-axis) and/or a rotating movement (in two or three directions, pitch, yaw, and optionally roll) of the first movement depends on how the first body 102 and thus the first input device 106 is pushed and twisted around the first origin.

The first input device 106 is arranged to control the virtual environment with relative movements in the virtual environment. This means that as long as the first input device 106 is pushed/twisted, i.e. as long as it is not in the first origin, the first input device will provide controlling movements to the virtual environment. For example, if the virtual environment comprises a car which is controlled by the input controller 100, a force (e.g. a push by a hand of a user) acting on the first input device 106 in the x-direction will result in a movement of the car in a corresponding direction of the virtual environment as long as the force continues to act on the first input device 106. The speed or the acceleration of the movement of the car will depend on how far from the origin the first input device 106 is pushed by the force.

The second body 104 comprises a second input device 108. The second input device 108 is arranged to control the virtual environment with absolute movements in the virtual environment. In the exemplary embodiment of FIG. 1, the second input device 108 is a pressure pad 108. The pressure pad 108 is located on top of the second body which is advantageous in that a user can control the pressure pad 108 by using his thumb when holding the input controller 100. The pressure pad 108 is arranged for receiving an input in 2 degrees of freedom in respect of a second origin, wherein the second origin is located at a position on the pressure pad 108 in which a proceeding input was received by the pressure pad 108. The preceding input for such a pressure pad may be when a sensor (not shown) of the pressure pad 108 first reads that e.g. a finger is pressed against the pressure pad 108. Then for forming the second movement, new readings (i.e. a received input) are done by the sensor continuously with a fixed time interval between each reading) as long as the sensor reads that the finger is pressed towards the pressure pad. The distance the finger has moved between each reading and the direction of the movement of the finger is transformed to the second movement in an absolute way. This means that if the second movement controls the gear lever of the car, the gear lever will move in the direction in which the finger moves on the pressure pad 108. The second movement thus corresponds to a received input of the pressure pad 108 in respect of the second origin. The displacement of the movement of the gear lever in that direction is based on a distance between a position of the received input, e.g. where the finger currently is sensed on the pressure pad 108, and the second origin. If the finger is held still, the gear lever will stop moving. If the finger leaves the pressure pad 108 and then again is sensed by the sensor of the pressure pad, a new movement will begin, the old second origin will be disregarded and a new second origin will be located at the position on the pressure pad in which the finger first is sensed by the sensor.

The input controller 100 of FIG. 1 is symmetrically shaped. This may be advantageous since for ergonomically reasons. In the example embodiment of FIG. 1, each of the first 102 and the second body 104 has a substantially cylindrical shape and the first body 102 is connected with the second body 104 such that the input controller 100 is shaped as an eight in cross section. This design makes it possible to turn the input control 180 degrees, if the user prefers to control the first input device with the right hand instead of the left. The preferences of the input controller 100 may allow for such rotation.

It should be noted that the pressure pad 108 may be replaced by any other device providing at least 2 degrees of freedom in respect of a second origin. For example, a trackball may be used. In this case, the user may control the displacement of the second movement by rotating of the trackball. In other words, an amount of rotation of the second input device relative the second origin controls the displacement of the second movement.

A game situation wherein the virtual environment of a game is controlled by the input controller 100 will now be described.

The player puts on a VR headset and pick up the input controller 100. The player starts the game controlling the pointer with the pressure pad 108. The player looks around by turning his head (the headset detects and relays the input to the game), move his body within the game freely in 6 DOF by pushing and/or twisting the first input device 106. When encountering a bad guy, the player can aim fast and accurate with the pressure pad 108 controlling the cross-hair in 2D within the view. When the player is in a tight spot, he can do all these things at the same time; run away from an opponent by pushing the first input controller 106 forward, jump over an obstacle by pushing the first input controller 106 upwards and forwards, look over his shoulder by turning his head and the headset will relay that input, and aim accurately controlling the cross-hair (note; not the view) in the view with the pressure pad 108.

The two most typical control situation a user is facing in a virtual 3D world is moving and aiming. Since the player is in an "endless" world a relative input is required for moving. Compare by using an absolute movement, e.g. a computer mouse where a movement by several meters may be needed. Using a relative input device, the user can move the first input device 106 a few millimeters in order to increase the velocity and reach the desired position. On the other hand when the user wants to do a quick movement with precision in a confined space, e.g. aiming a gun, an absolute movement may be a better alternative, since the movement in the 3D world corresponds to the movement in real life.

By providing a 5 or 6 DOF input device, i.e. the first input device 106, the user can perform one natural movement, the first movement, and engaging just one hand. The second hand may then be free for providing the second movement. Compare this with using two or more 2D controllers, the user then have to combine 3 unnatural movements using both hands to perform the same movement in the 3D world.

Figure 2:
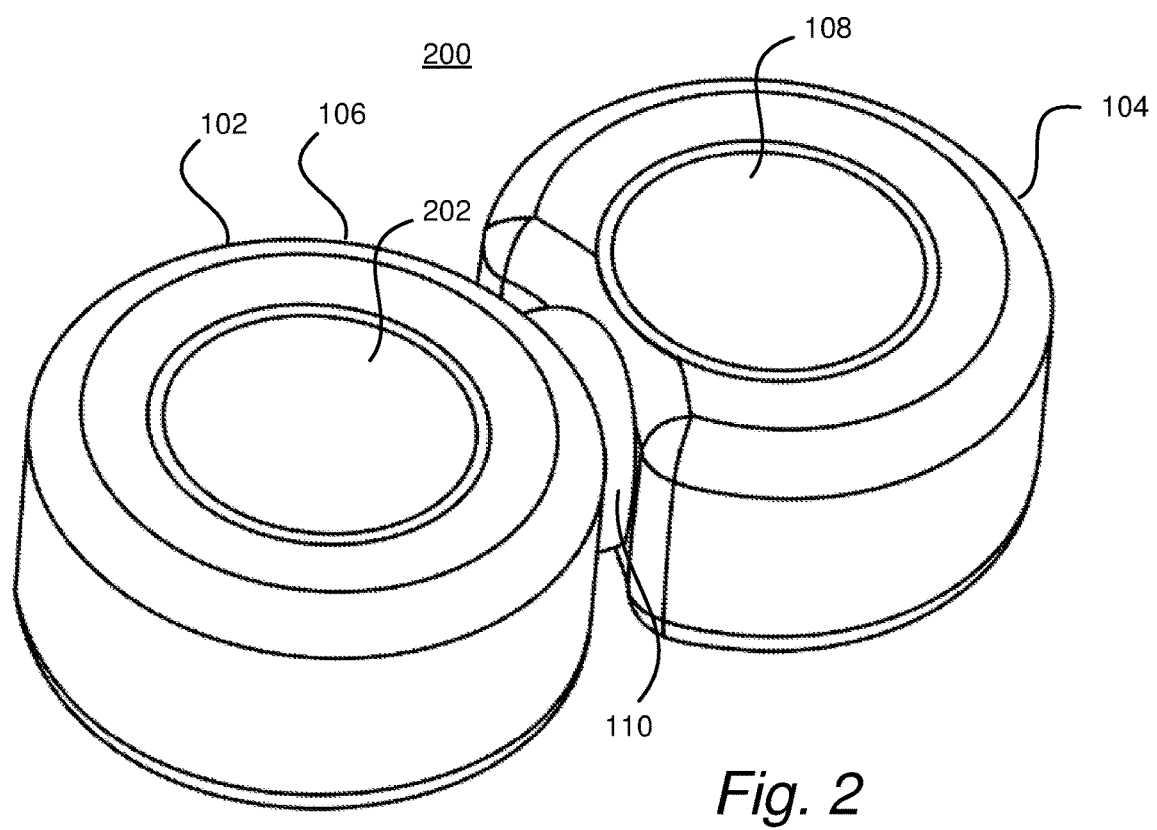
FIG. 2 shows an input controller according to a second embodiment.

FIG. 2 describe a similar input controller 200 as the input controller 100 in FIG. 1. The difference between the input controller 200 and the input controller 100 of FIG. 1 is that the input controller 200 comprises a second pressure pad 202 located on top of the first body 102. By this embodiment, a user can provide a third movement in the virtual environment, in the same way as the second movement described above in conjunction with FIG. 1. The second pressure pad 202 is advantageously positioned for easy access of the thumb of a user of the input controller 200.

Figure 3:
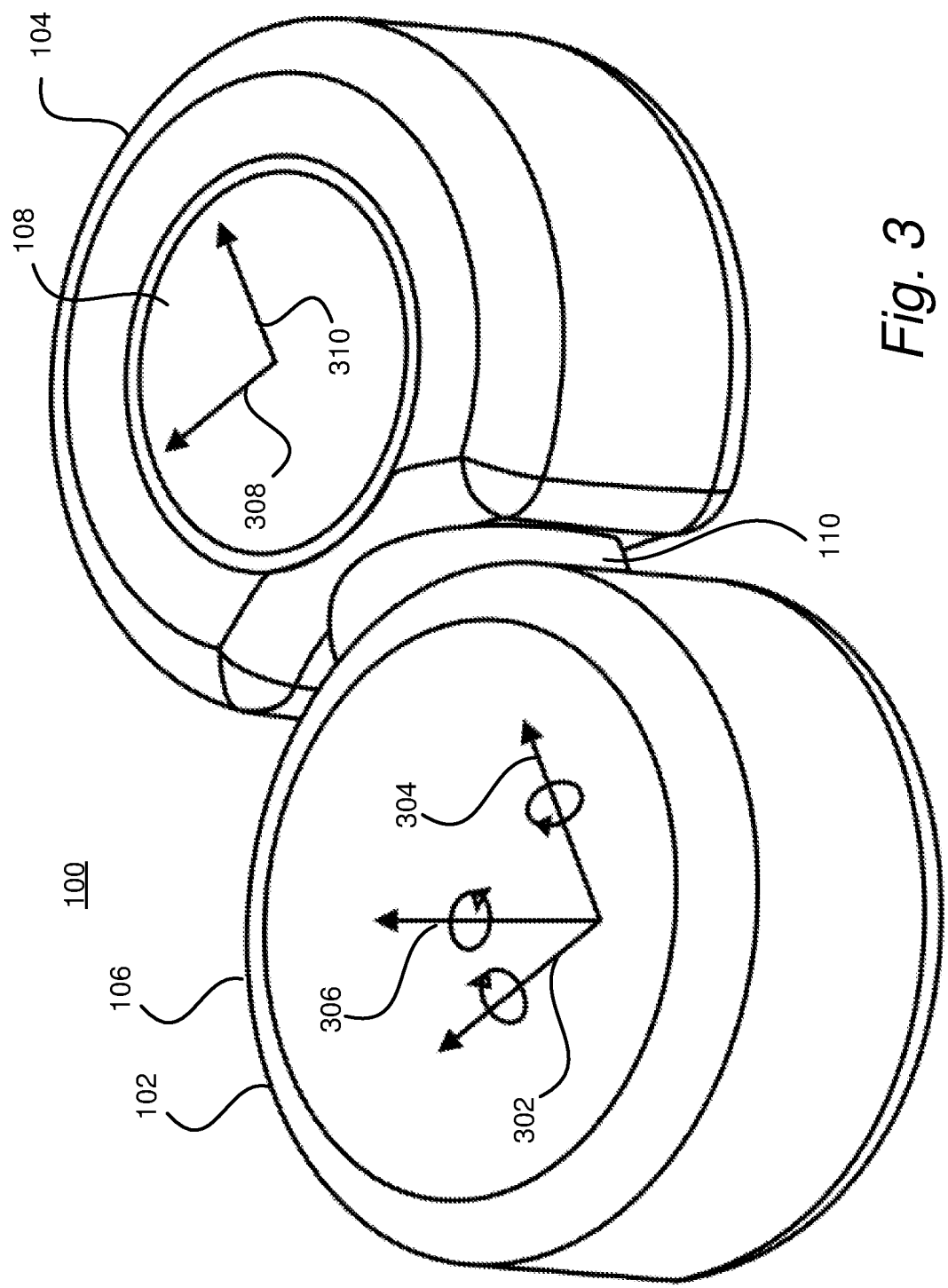
FIG. 3 describes how the first input device of the input controller of FIG. 1 is arranged to move around a first origin with 6 degrees of freedom, FIG. 4 describes an input controller according to a third embodiment.

FIG. 3 describe the 6 DOF of the movement of the first input device 106 in respect of the first origin. The first origin may according to some embodiments be placed in the centre of mass of the first body 102. The first origin may according to some embodiments be placed in the centre of volume of the first body 102. The first origin may according to some embodiments be placed in the centre of the suspension of the first body on the second body 104. As shown in FIG. 3, the first body 102, and thus the first input device 106, can move forward/backward along the x-axis 302, up/down along the z-axis 306, and left/right along the y-axis 304. The first body 102 thus can move via translation in all three perpendicular axes. The first body is also configured for rotation about the three perpendicular axes 302, 304, 306. Such rotation is often termed pitch, yaw, and roll when translated into movements in the virtual environment. If a 5 DOF input device is used, the roll rotation may be omitted. According to some embodiments, another of the rotations is omitted, e.g. pitch or yaw.

FIG. 3 also describe how a pressure pad 108 is arranged to receive an input in 2 degrees of freedom, i.e. along the perpendicular axis 308, 310. As described above, the second origin moves depending on where on the pressure pad the sensor of the pressure pad 108 first reads a touch from e.g. a finger of a user.

Figure 4:
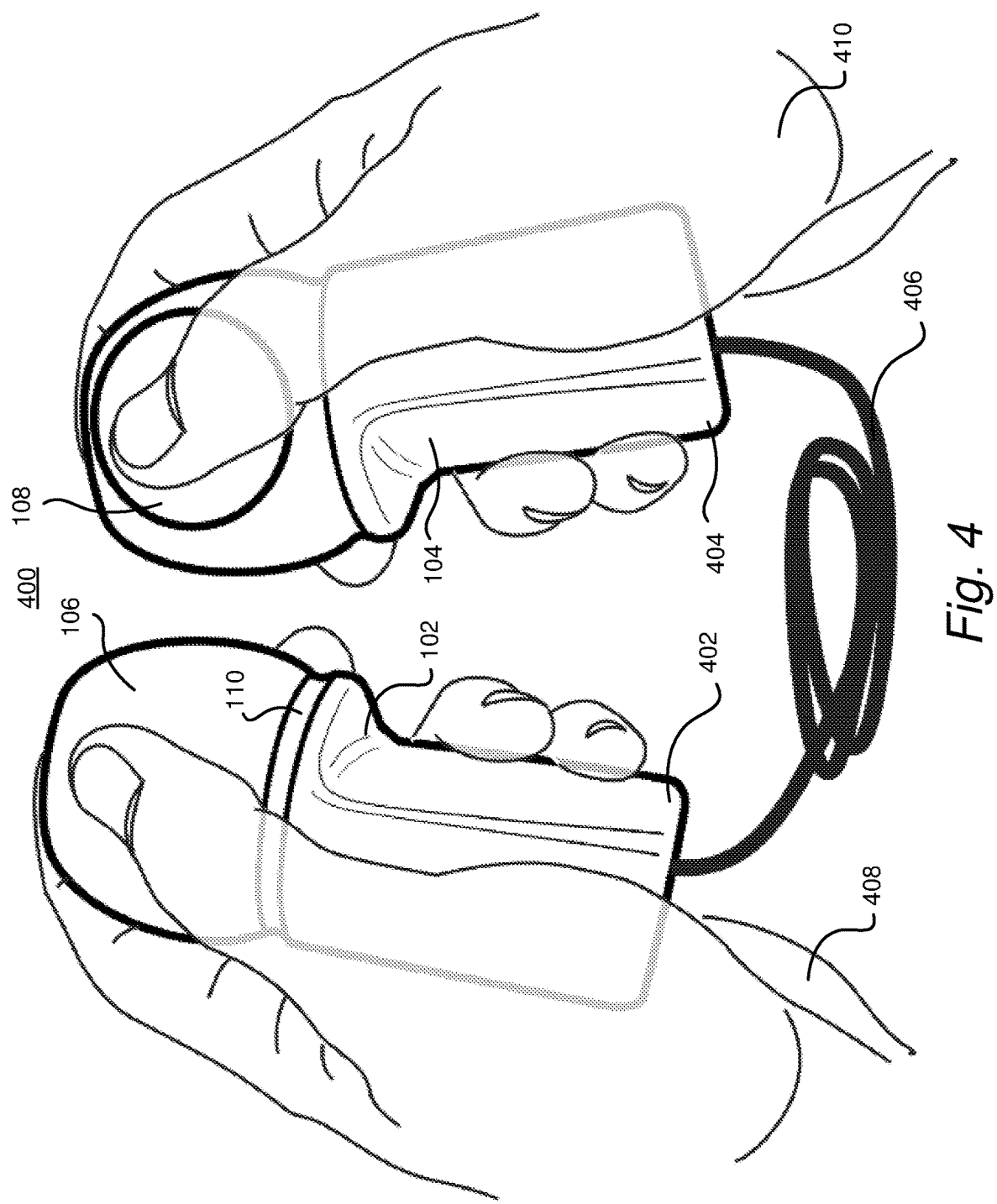

FIG. 4 shows by way of example a third embodiment 400 of the input controller described herein. According to this embodiment, the first body 102 and the second body 104 are separate from each other but connected via a wire 406 configured to transmit data between the first 106 and the second 108 input device. Each of the first 102 and the second 104 body comprises an elongated handle portion 402, 404 configured for holding by a single hand 408, 410 of a user. In the embodiment of FIG. 4, the first input device 106 is disposed at one end of the elongated handle portion 402 of the first body 102. The first input device 106 is resiliently suspended, via a flexible joint 110, on the elongated handle portion 402 of the first body 102. The first body 102 may provide a suspension device for the suspension of the first input device 106. The suspension device may comprise an end part shaped as a thin and flat object, e.g. a plate or a disc, or an end part having a spherical shape. The end part may be arranged substantially at the center of the first input device 106. The first input device 106 may be suspended by a plurality of springs, such as three springs, such as four springs. The springs may be evenly spaced apart. The springs may be rigidly fixed to the first body 102 and the first input device 106 such that tension may build up in the springs as a result of a force applied to the first input device 106. It is to be understood that a flexible material may be used to suspend the first input device 106 such that a similar function of tension build-up is achieved.

Alternatively, not shown in FIG. 4, the second body 104 may comprise a second input device, such as an accelerometer as described in conjunction with FIG. 5 below, such that input in 3 degrees of freedom may be received. Hereby, absolute movement in 3 degrees of freedom relative a second origin may be sensed. The second origin may be set by a user by for instance pushing a button located on the input controller. The accelerometer may be placed in the elongated handle portion 404.

This design makes it possible for a user to move the first input controller 106 in respect of the first origin with 6 DOF in a convenient way. The first origin may according to some embodiments be placed in the centre of mass of the first input device 106. The first origin may according to some embodiments be placed in the centre of volume of the first input device 106. The first origin may according to some embodiments be placed in the centre of the suspension of the first input device 106 on the elongated handle portion 402 of the first body 102. The first input device is advantageously substantially shaped as a ball, possibly with its top cut off; this facilitates easy movement of the first input device 106 in respect of the first origin.

According to some embodiments, the second input device 108 is a pressure pad 108 positioned on the second body 104 proximate to a location of a thumb of the user's single hand 410 when the input controller 400 is held. The pressure pad 108 provides input control to the virtual environment as described above. It should be noted that the second input device instead may be arranged for receiving the input in 6 degrees of freedom in respect of the second origin by movement of the second body around the second origin. This means that when the user moves the second body around in the air (space), the second input device provides input control to the virtual environment via a second movement with 6 DOF. The second input device thus works as a Motion Controller, e.g. a Sony Move controller or a Nintendo Wii controller, by providing absolute movements to the virtual environment with 6 DOF. By moving the second body 104, a user can accomplish position control by allowing position and movement tracking of the second body by the gaming system that relates to the player's movements and use these movements as inputs to the virtual environment, e.g. by using a gyroscope in the second body 104. A further input device, e.g. a pressure pad, may be added to the second body, for example as described in FIG. 4. By directly connect the second body 104 with the first body 102 via a wire 406 for transmitting data between the first 106 and the second 108 input device, the two separate input devices 106, 108 could advantageously share resources such as a processor, memory, Wi-Fi transceiver etc.

Figure 5:
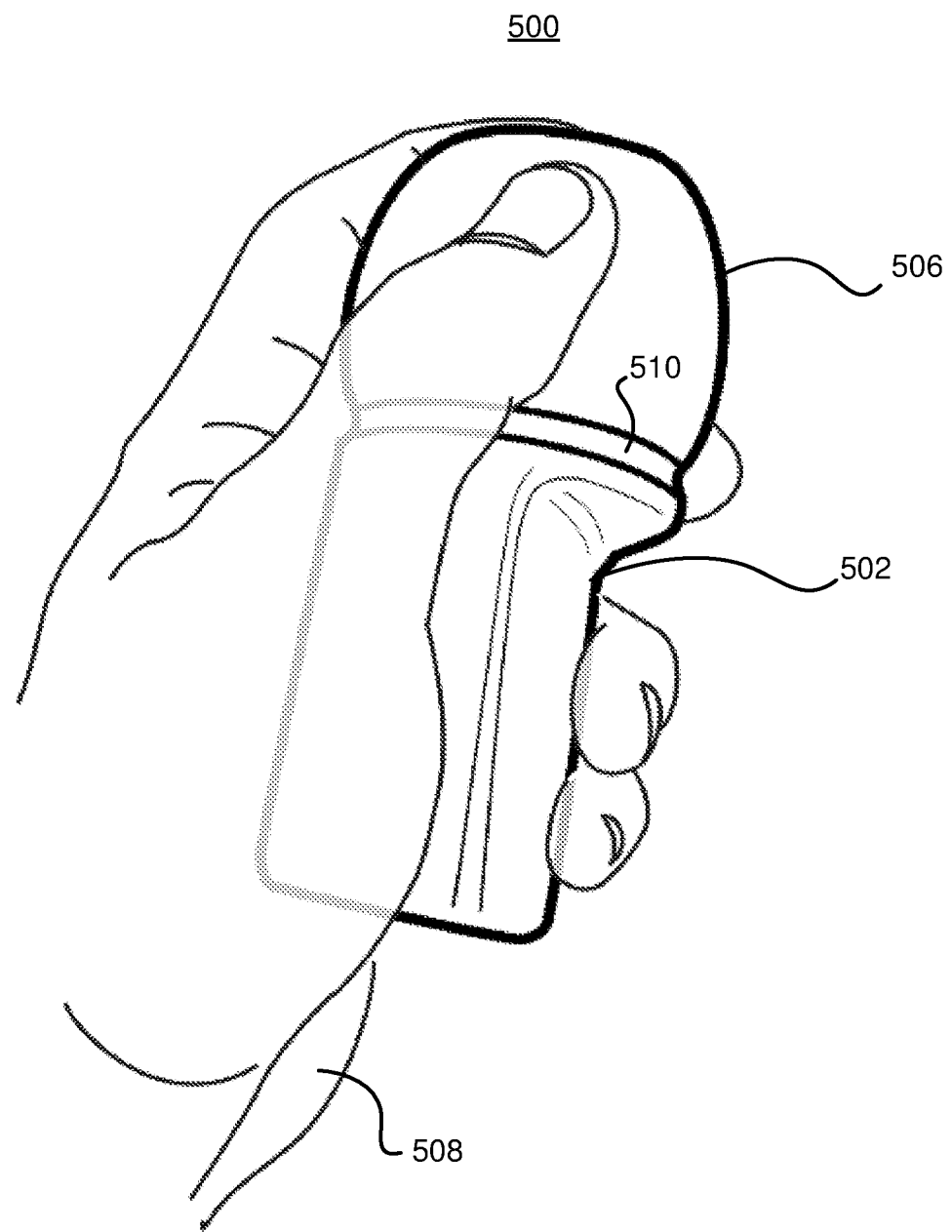
FIG. 5 shows the first body and the first input device of the input controller of FIG. 4 used as a separate input controller, FIG. 6 describes an input controller according to a fourth embodiment, FIG. 7 describes an input controller according to a fifth embodiment.

FIG. 5 shows an input controller 500 which comprises the 5 or 6 DOF part of the input controller of FIG. 4. The input controller 500 thus functions and is designed as the first body 102 of FIG. 4. The input controller 500 comprises an elongated handle portion 502 configured for holding by a single hand 508 of a user. The first input device 506 is disposed at one end of the elongated handle portion 402. The first input device 506 is resiliently suspended, via a flexible joint 510, on the elongated handle portion 502 of the input controller 500. The first input device 506 may be suspended on the elongated handle portion 502 by a suspension device of similar design and function as the suspension device described in conjunction with FIG. 4. The input controller 500 comprises a second input device, such as an accelerometer, such that input in 3 degrees of freedom may be received. Hereby, absolute movement in 3 degrees of freedom relative a second origin may be sensed. The second origin may be set by a user by for instance pushing a button located on the input controller 500. The accelerometer may be placed in the elongated handle portion 502.

Figure 6:
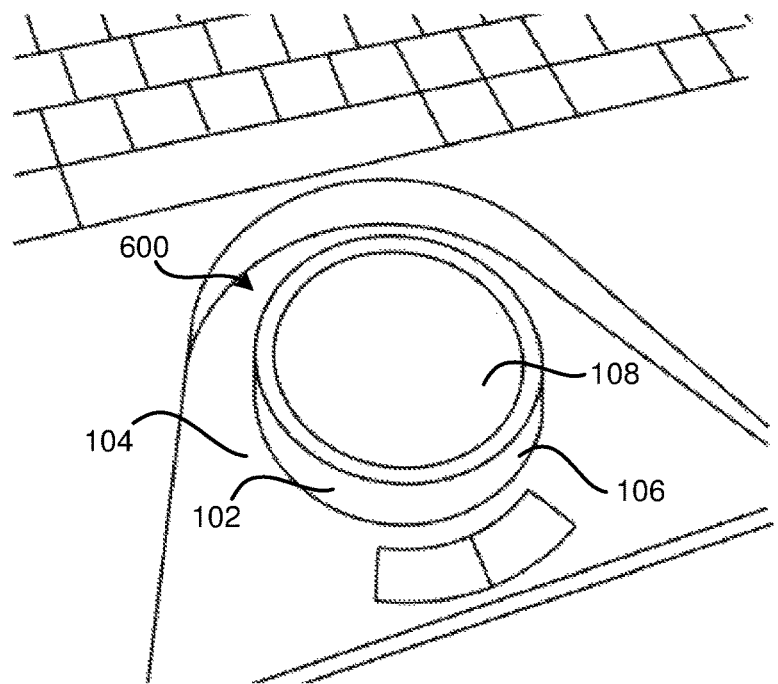

FIG. 6 shows a further embodiment of an input controller 600. This input controller 600 is designed to be positioned on e.g. a table or another fixed surface, such as a body 104 of a laptop computer. In FIG. 6, the input controller 600 replaces the touch pad of a laptop. The first input device 106 may be resiliently suspended on a bottom surface of the input controller 600. The pressure pad 108 functions as described above. The second body 104 may provide a suspension device of similar design and function as the suspension device described in conjunction with FIG. 4. The second body 104 may provide a suspension device for the suspension of the first input device 106. The second body may be fixedly attached to the fixed surface, such as the body 104 of a laptop computer, such that the second input device 108 will not move when the first input device 106 moves. The first input device is thus a cylinder shaped device that encompasses the protruding part of the second body 104, and is arranged to move around the protruding part, wherein the pressure pad 108 is located on a top surface of the protruding part.

Figure 7:
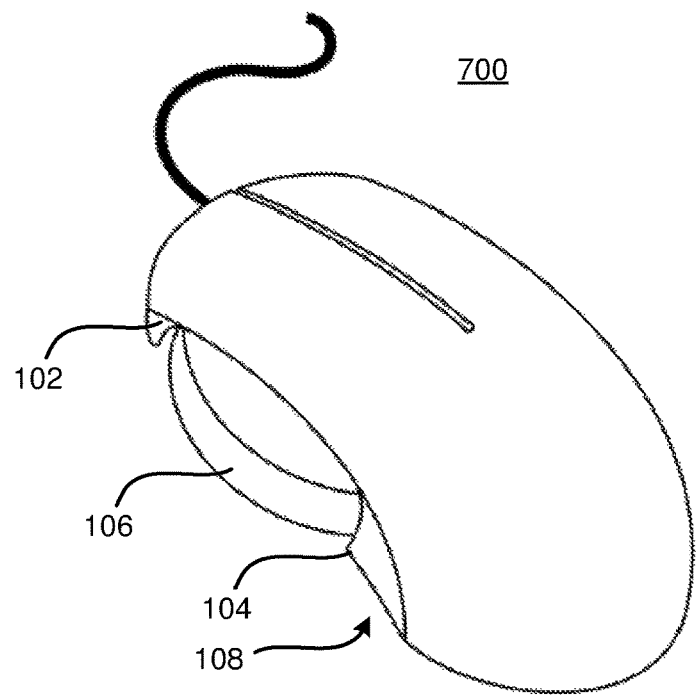

FIG. 7 describes an input controller 700 according to a fifth embodiment. The first body 102 and the second body 104 are integrally formed. The input controller 700 is configured for holding by a single hand of a user and moved on an underlying surface. The input controller 700 may for example be shaped as a computer mouse. By moving the input controller 700 on the underlying surface, an absolute input control may be provided to the virtual environment in the same way as an input provided by a regular computer mouse. In other words, the received input of the second input device 108 is based on a movement of the input controller 700 relative to the underlying surface. The second input device 108 may function as in a mechanical computer mouse or in an optical computer mouse. In FIG. 7, the bottom surface of the input controller 700 comprises a recess, and the first input device 106 is resiliently suspended in the recess. This provides easy access and controllability of the first input device 106 when the user holds the input controller 700 as a computer mouse. The input controller 700 in FIG. 7 comprise a wire but may also be wireless. The input controller may comprise further input devices (not shown), such as buttons on top of the input controller.

Figure 8:
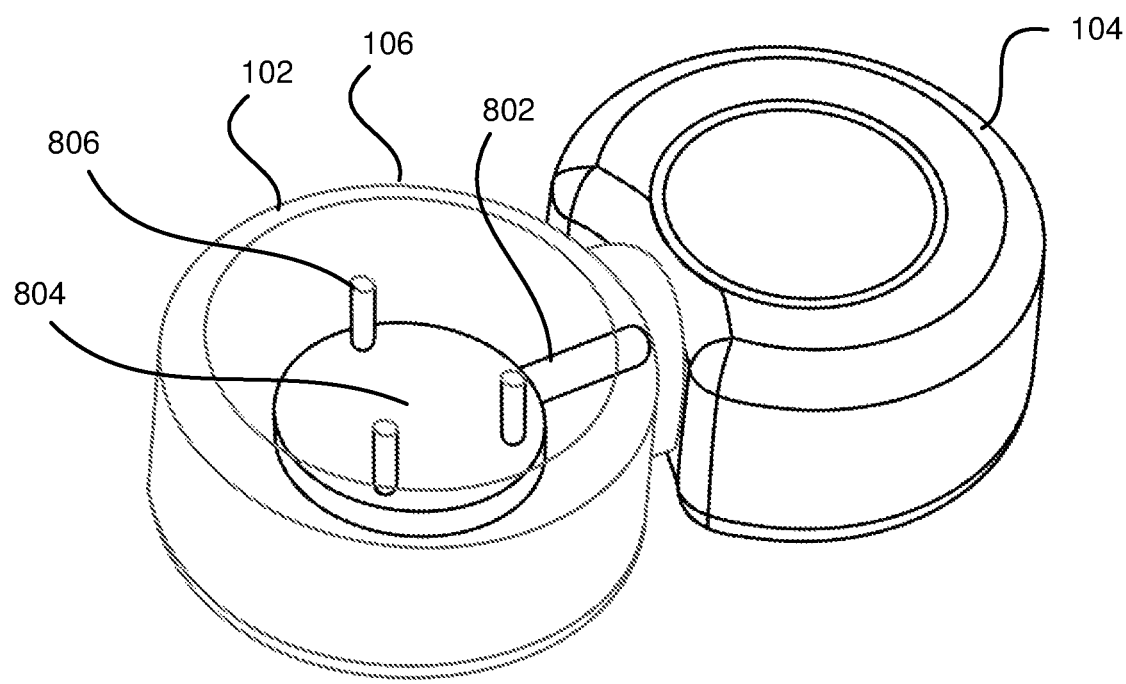
FIG. 8 describes an input controller according to a sixth embodiment.

FIG. 8 describes an input controller according to a sixth embodiment. The second body 104 may provide a suspension device 802 for the suspension of the first body 102. The suspension device 802 may comprise an end part 804 shaped as a thin and flat object, e.g. a plate or a disc. The end part 804 may be arranged substantially at the center of the first body 102. The first body 102 may be suspended by a plurality of springs 806, such as three springs, such as four springs. The springs 806 may be evenly spaced apart. The springs 806 may be rigidly fixed to the first and the second body 102, 104 such that tension may build up in the springs 806 as a result of a force applied to the first and/or second body 102, 104. It is to be understood that a flexible material may be used to suspend the first body 102 such that a similar function of tension build-up is achieved.

Figure 9:
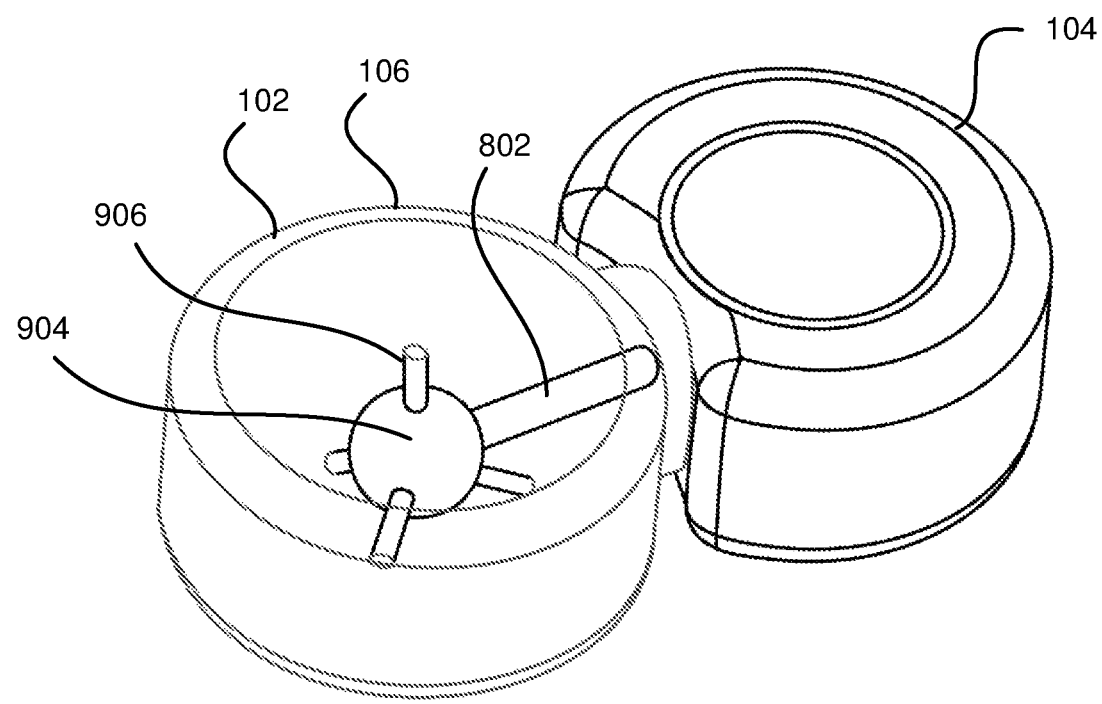
FIG. 9 describes an input controller according to a seventh embodiment.

FIG. 9 describes an input controller according to a seventh embodiment comprising a suspension device with a similar function to the embodiment described in FIG. 8. The second body 104 may provide a suspension device 802 for the suspension of the first body 102. The suspension device 802 may comprise an end part 904 having a spherical shape. The end part 904 may be arranged substantially at the center of the first body 102. The first body 102 may be suspended by a plurality of springs 906, such as three springs, such as four springs. The springs 906 may be evenly spaced apart. The springs 906 may be rigidly fixed to the first and the second body 102, 104 such that tension may build up in the springs 906 as a result of a force applied to the first and/or second body 102, 104. It is to be understood that a flexible material may be used to suspend the first body 102 such that a similar function of tension build-up is achieved. The movement of the second body relative the first body may be detected by a sensor, such as a 3D-sensor as described in EP0920672B1 on pages 2-3, sections 0010-0014, 0016-0017, and 0021, and/or by PSD's (Position Sensing Devices) or similar. A situation wherein a virtual environment is advantageously controlled by the input controller 700 will now be described.

The user is opening up a spreadsheet with a mouse movement of the input controller (i.e. the second movement) and a click, as the user normally does with a computer mouse. The user then starts using the first input device 106 and zooms out to see the vast spreadsheet, pans around, locates the cell he is looking for and zooms in on that. The user then edits the cell by using the second input device 108 and any buttons on the input device 700.

The user then open up a photo editor and pans, zooms and even rotates a photo with the first input device 106, pick a tool using the second input device 108, and edits the photo by continue using the second input device, or even with a connected stand alone input device such as a drawing pad.

It should be noted that according to some embodiments, the first input device may be configured to change between providing a relative input (and thus provide a relative movement to the virtual environment) and an absolute input (and thus provide an absolute movement to the virtual environment) by changing a configuration of the first input device.

The present invention has mainly been described above with reference to a few embodiments. However, as readily appreciated by a person skilled in the art, other embodiments than the ones disclosed above are equally possible within the scope of the invention, as defined by the appended patent claims.

As an example, the input controller in the embodiments of FIGS. 1-7 may comprise a sensor in accordance with the embodiments of FIG. 8-9.

In summary, the present invention relates an input controller for interacting with a virtual environment, and more specifically to an input controller comprising a first body and a second body connected to the first body, wherein the first body comprises a first input device and the second body comprises a second input device. The first input device provides input control to the virtual environment with a first movement with at least 5 degrees of freedom in the virtual environment, the first movement being an relative movement, and the second input device provides input control to the virtual environment with a second movement with at least 2 degrees of freedom in the virtual environment, the second movement being an absolute movement.

The invention claimed is:

1. An input controller for interacting with a virtual environment, comprising:
    a first body and
    a second body connected to the first body,
    wherein the first body comprises:
        a first input device resiliently suspended on the input controller so as to spring-back to a first origin when moved and released,
        the first input device being arranged to move relative the first origin with at least 5 degrees of freedom and arranged to interact with the virtual environment by a first movement with at least 5 degrees of freedom in the virtual environment,
        the first movement corresponding to a movement by the first input device relative the first origin, wherein the first movement is a relative movement,
    wherein the second body comprises:
        a second input device being arranged for receiving an input in at least 2 degrees of freedom relative a second origin,
        the second input device being arranged to interact with the virtual environment by a second movement with at least 2 degrees of freedom in the virtual environment,
        the second movement corresponding to a received input of the second input device relative the second origin, wherein the second movement is an absolute movement,
    wherein the input controller further comprises
        a suspension device fixed to the input controller and extending on an inside of the first body to a center of the first input device,
        the suspension device providing a suspension point substantially at a center of the first input device for the resilient suspension of the first input device, wherein the first origin is located at the suspension point, and
    wherein the first body and the second body are separated such that the received input of the second input device relative the second origin is received without implicating movement of the first input device relative the first origin.

2. The input controller according to claim 1, wherein the suspension device comprises an end part substantially at the center of the first input device, and a plurality of springs attached to the end part, wherein the first input device is resiliently suspended on the input controller by being attached to the plurality of springs.

3. The input controller according to claim 2, wherein the end part has a spherical shape, and wherein the plurality of springs is attached to the surface of the spherical shaped end part in an evenly spread out fashion.

4. The input controller according to claim 2, wherein the end part is shaped as a thin and flat object, and wherein the plurality of springs is attached to one side of the end part in an evenly spread out fashion.

5. The input controller according to claim 1, wherein the suspension device is fixed to the second body.

6. The input controller according to claim 1, wherein the first origin is located substantially at the center of the first body.

7. The input controller according to claim 1, wherein the first input device is arranged to move around the first origin with at least 5 degrees of freedom by movements of the first body relative the second body.

8. The input controller according to claim 1, having a symmetrical design.

9. The input controller according to claim 8, wherein each of the first and the second body has a substantially cylindrical shape and wherein the first body is connected with the second body such that the input controller is shaped as an eight in cross section.

10. The input controller according to claim 1, wherein the second input device is a pressure pad and wherein the second origin is located at a position on the pressure pad in which a proceeding input was received by the pressure pad.

11. The input controller according to claim 1, wherein each of the first and the second body comprises an elongated handle portion configured for holding by a single hand of a user and wherein the first body is directly electrically connected to the second body via a wire.

12. The input controller according to claim 11, wherein the suspension device is fixed to the elongated handle portion of the first body.

13. The input controller according to claim 11, wherein the first input device is disposed at one end of the elongated handle portion of the first body, wherein the first input device is resiliently suspended on the elongated handle portion of the first body.

14. The input controller according to claim 11, wherein the second input device is a pressure pad positioned on the second body proximate to a location of a thumb of the user's single hand, when the input controller is held, and wherein the second origin is located at a position on the pressure pad in which a proceeding input was received by the pressure pad.

15. The input controller according to claim 11, wherein the second input device is arranged for receiving the input in 6 degrees of freedom relative the second origin by movement of the second body relative second origin, wherein the second origin is located at a position in space in which the second body was located when a proceeding input was received by the second input device.

16. The input controller according to claim 1, wherein the first body and the second body are integrally formed, and wherein the input controller is configured for holding by a single hand of a user and moved on an underlying surface, wherein the received input of the second input device is based on a movement of the input controller relative to the underlying surface.

17. The input controller according to claim 16, wherein the input controller has a recess in a surface of the input controller configured to be moved on the underlying surface, wherein the first input device is resiliently suspended in the recess.

18. The input controller according to claim 1, wherein the first body and the second body are integrally formed, wherein the second body comprises a protruding part, wherein the first input device is a cylinder shaped device that encompasses the protruding part of the second body, and is arranged to move around the protruding part, and wherein the second input device is a pressure pad located on a top surface of protruding part, and wherein the second origin is located at a position on the pressure pad in which a proceeding input was received by the pressure pad.

* * * * *